United States Patent
Adams et al.

(10) Patent No.: US 8,417,773 B2
(45) Date of Patent: Apr. 9, 2013

(54) METHOD AND STRUCTURE FOR AUTOMATED LAYOUT DIRECTOR

(75) Inventors: Samuel S. Adams, Apex, NC (US); Peter Malkin, Ardsley, NY (US); Jeremy Brand-Sussman, Bedford Hills, NY (US)

(73) Assignee: International Business Machines Corporation, Armonk, NY (US)

( * ) Notice: Subject to any disclaimer, the term of this patent is extended or adjusted under 35 U.S.C. 154(b) by 3211 days.

(21) Appl. No.: 10/785,227

(22) Filed: Feb. 25, 2004

(65) Prior Publication Data

US 2005/0188321 A1   Aug. 25, 2005

(51) Int. Cl.
*G04F 15/16* (2006.01)
*H04M 3/42* (2006.01)

(52) U.S. Cl. .................................. 709/204; 379/202.01

(58) Field of Classification Search .................. 709/204
See application file for complete search history.

(56) References Cited

U.S. PATENT DOCUMENTS

| | | | |
|---|---|---|---|
| 4,054,908 A | 10/1977 | Poirier et al. | |
| 5,382,972 A | 1/1995 | Kannes | |
| 5,675,374 A | 10/1997 | Kohda | |
| 5,764,277 A | 6/1998 | Loui et al. | |
| 5,801,756 A | 9/1998 | Iizawa | |
| 5,953,050 A * | 9/1999 | Kamata et al. | 348/14.09 |
| 6,018,346 A * | 1/2000 | Moran et al. | 715/863 |
| 6,038,543 A | 3/2000 | Kurosawa | |
| 6,078,349 A | 6/2000 | Molloy | |
| 6,128,649 A | 10/2000 | Smith et al. | |
| 6,473,114 B1 | 10/2002 | Strubbe | |
| 6,559,863 B1 | 5/2003 | Megiddo | |
| 2002/0093531 A1 | 7/2002 | Barile | |
| 2003/0001890 A1 | 1/2003 | Brin | |
| 2004/0161090 A1* | 8/2004 | Digate et al. | 379/202.01 |
| 2004/0162877 A1* | 8/2004 | Van Dok et al. | 709/204 |

* cited by examiner

*Primary Examiner* — Phuoc Nguyen
*Assistant Examiner* — Kishin G Belani
(74) *Attorney, Agent, or Firm* — McGinn IP Law Group, PLLC

(57) ABSTRACT

A method (and structure) of providing a composite data feed for an online meeting includes at least one of providing a capability for at least one participant node in the online meeting to input a layout rule for a customized composite image of the online meeting and receiving a layout rule defining a composite image of the online meeting that can be customized for at least one participant node in the online meeting.

14 Claims, 8 Drawing Sheets

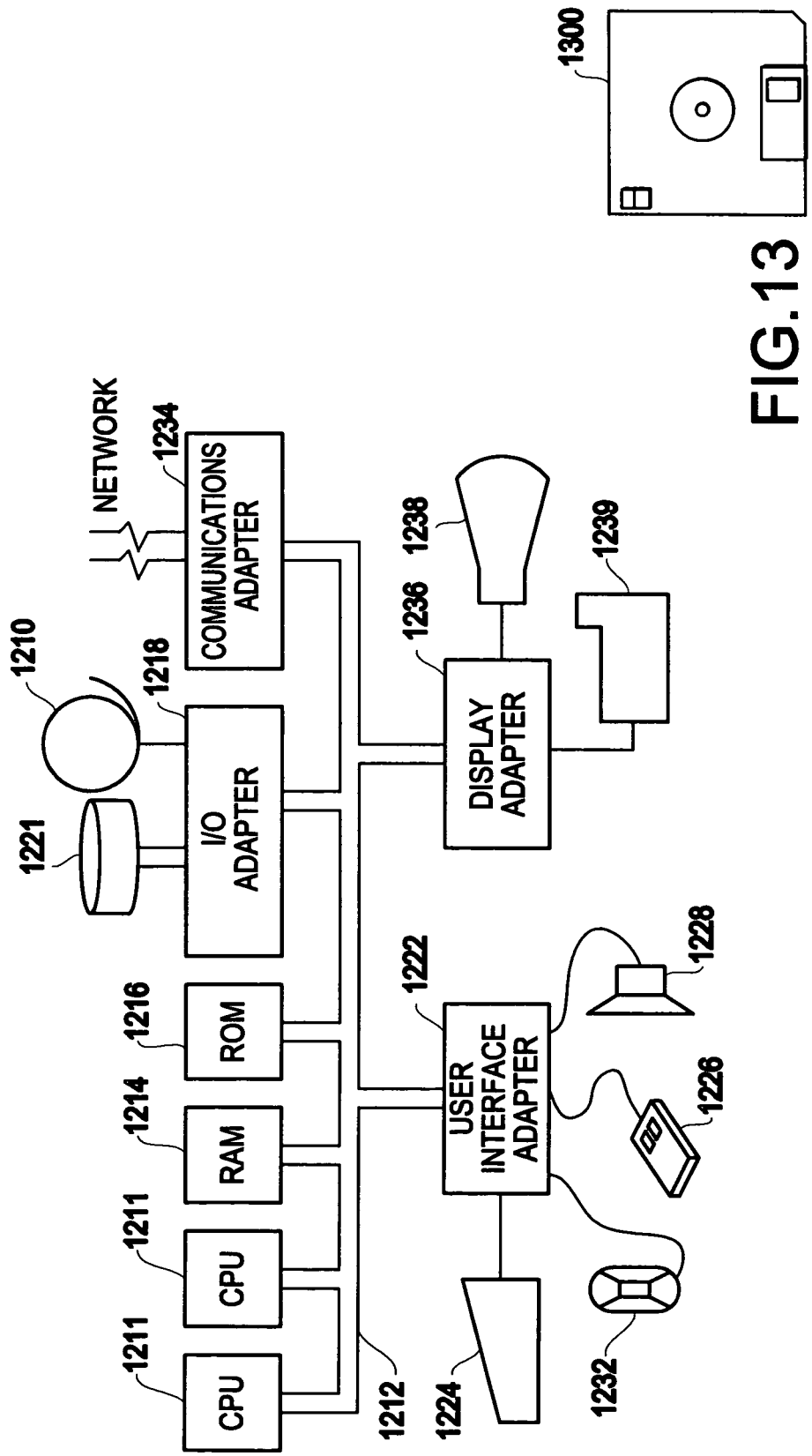

METHOD AND STRUCTURE FOR AUTOMATED LAYOUT DIRECTOR

BACKGROUND OF THE INVENTION

1. Field of the Invention

The present invention generally relates to an online data feed coordinating technique. More specifically, multiple feeds, such as those provided in an online meeting, are formatted into a single composite, multi-paned window display and participant nodes can uniquely program their composite display.

2. Description of the Related Art

With increased bandwidth available at lower costs, and increased inexpensive multimedia processing, the popularity and use of online meetings (e.g., eMeetings) has increased dramatically. In general, such meetings consist of multiple remotely located participants, each providing and receiving both a video and audio feed. A problem arises as to how to select and/or combine these feeds for display to each of the meeting's participants.

For example, "Sametime Meeting"® is a product that allows a given meeting participant to "share" their computer screen with other meeting participants. This sharing displays all windows of the given user's computer on the other participants' computers. Only one participant's screen can be shared at a given time, two participants' screens cannot be viewed at once.

U.S. Pat. No. 4,054,908 to Poirier et al. describes a system and method in which the audio from all meeting participants is combined and broadcast to all, but where only the video from the party with the loudest audio signal is sent. Here again, participants are able to see only one video feed at a time.

U.S. Pat. No. 6,128,649 to Smith et al. also describes a system and method providing the broadcast of only one of several input feeds. With this invention, each participant is able to specify his or her own selection criterion, but still only one video is broadcast at a given time.

U.S. Pat. No. 5,382,972 to Kannes describes a system that combines video feeds and provides a composite image to each of the meeting's participants. The composite image is composed of several tiled windows, one tile of which is larger than the others. One of the video feeds, the "primary feed," is displayed in this larger section. This primary feed is determined either by one of the meeting's participants (e.g., the chairperson) or by monitoring which of the feeds has the loudest audio signal. Here, every participant sees the same composite image. That is, the individual participants cannot specify their own feed arrangement rules.

U.S. Pat. No. 5,953,050 to Kamata et al. describes a system and method that provides a composite image to each of the meeting participants, where the composite image includes a tiling of the feeds from the meeting's one or more participants. Here, each participant can indicate how he or she wants the feeds arranged in the composite image. This invention is limited in that it only allows for two feed-image reduction rates, one for the active speaker and another for non-speakers. Individual users cannot specify their own arbitrary rates.

Further, the technique described by Kamata et al. only allows one pane to be designated as the "speaker's" pane (e.g., the largest). There is no way provided to a given participant to have more than one feed kept to have this selection based on a criterion other than who is the current speaker.

For example, in a scenario involving a salesperson and a customer and using the conventional methods described above, there is no provision for the salesperson to emphasize the customer's image, regardless of whom is currently speaking.

Thus, there remains a need for a system and method that takes the audio and video feeds from the multiple users of an online meeting, combines them and returns a composite image to each participant, where each participant potentially is able to specify their own composite layout arrangement rules. A need also remains for a method and system where the criteria for these layout rules are not restricted to audio level and explicit user choices.

SUMMARY OF THE INVENTION

In view of the foregoing, and other, exemplary problems, drawbacks, and disadvantages of the conventional systems, it is an exemplary feature of the present invention to provide an online meeting in which any or all participating nodes can potentially receive its own customized composite image of the online meeting.

It is another exemplary feature of the present invention to provide a technique in which each participating node can potentially program its own layout rule to be used to generate its customized composite image of the online meeting.

It is yet another exemplary feature of the present invention to provide a technique in which the customized composite images of an online meeting can be dynamically changed during the course of the meeting.

To achieve the above exemplary features and others, in a first exemplary aspect of the present invention, described herein is a method of providing a composite data feed for an online meeting, including at least one of providing a capability for at least one participant node in the online meeting to input a layout rule for a customized composite image of the online meeting to be seen specifically at that participant node and receiving a layout rule defining a composite image of the online meeting that can be customized for at least one participant node in the online meeting.

In a second exemplary aspect of the present invention, also described herein is a method of providing a composite data feed for an online meeting, including calculating a composite image of the online meeting that is to be seen uniquely at a participant node, wherein a layout rule for the calculating of the composite image can be dynamically changed during a course of the online meeting.

In a third exemplary aspect of the present invention, also described herein is an apparatus including at least one of a graphical user interface to allow a participant node in an online meeting to provide a layout rule set for a customized composite image of the online meeting that is to be seen at that node, a receiver to receive a layout rule set that defines a customized composite image to be presented to a participant node in an online meeting, and a calculator to calculate a customized composite image to be presented to a participant node in an online meeting, the calculator receiving a plurality of feeds related to the online meeting and calculating the customized composite image in accordance with a layout rule set that defines a composite image to specifically be presented to a participant node.

In a fourth exemplary aspect of the present invention, also described herein is a system including a first participant node, at least one of a second participant node and a data feed node, and a network interconnecting the first participant node to the at least one of a second participant node and a data feed, the network thereby providing an online meeting including the first participant node. The first participant node receives a customized composite image of the online meeting that is calculated in accordance with a layout rule that defines a composite image to be presented specifically to the first participant node.

In a fifth exemplary aspect of the present invention, also described herein is a service including at least one of: conducting an online meeting in which any or all nodes participating in the online meeting receives a composite image of the online meeting that is potentially customized for each node; operating one of these nodes; calculating a composite image in the online meeting; providing a facility for the online meeting, where the facility involves at least one of a hardware or software component to be used in one of the nodes and at least one of a hardware or software component to be used in calculating a composite image in the online meeting; providing a maintenance for a facility for the online meeting; and providing a training for at least one of using and operating the online meeting or a facility for the online meeting.

In a sixth exemplary aspect of the present invention, also described herein is a signal-bearing medium tangibly embodying a program of machine-readable instructions executable by a digital processing apparatus to perform the above-described method of providing a composite data feed for an online meeting.

Thus, the present invention provides an improved technique of conducting online meetings by allowing each participant node in the online meeting to individually receive a customized composite image of the meeting. Additionally, the technique of the present invention allows a participating node to dynamically change the customized composite image during the course of the meeting.

BRIEF DESCRIPTION OF THE DRAWINGS

The foregoing and other exemplary features, aspects and advantages will be better understood from the following detailed description of an exemplary embodiment of the invention with reference to the drawings, in which:

FIG. 12 illustrates an exemplary hardware/information handling system 1200 for incorporating the present invention therein; and FIG. 13 illustrates a signal bearing medium 1300 (e.g., storage medium) for storing steps of a program of a method according to the present invention.

DETAILED DESCRIPTION OF AN EXEMPLARY EMBODIMENT OF THE INVENTION

Figure 1:
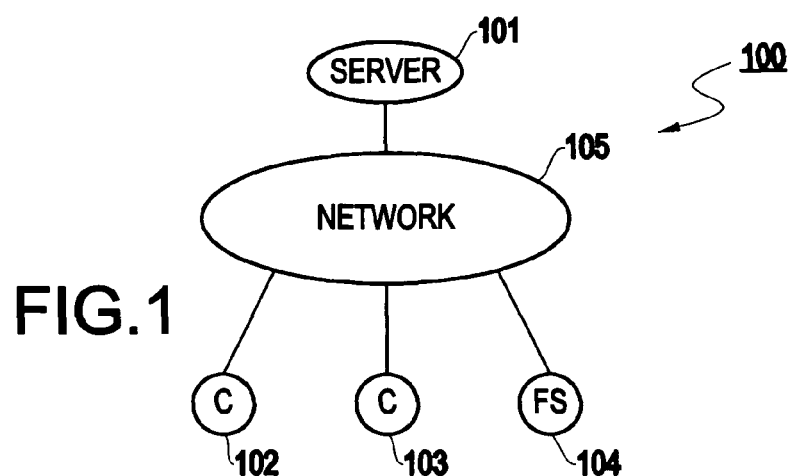
FIG. 1 shows an example of the network topology 100 of an exemplary embodiment.

Referring now to the drawings, and more particularly to FIGS. 1-13, exemplary embodiments of the present invention will now be described.

As shown in FIG. 1, in the exemplary embodiment 100 described herein for purpose of illustration only, this exemplary scenario provides an automatically and dynamically updated customized composite image of an online meeting involving only two participants, a customer node 102 and a salesperson node 103.

It will be apparent that this simple two-member eMeeting could easily be expanded, and that the exemplary composite images of this example could easily be envisioned as having different purposes than those exemplarily discussed in this scenario.

More generally, the current invention provides a method and system providing customized composite data feeds to each participant of an eMeeting. Each participant's layout is exemplarily based on (1) a set of layout rules specified by the given participant and, perhaps, (2) the relative level of activity in each of the feeds, as well as possibly other criteria.

Exemplary additional criteria might include, but are not limited to, the ownership status of a given feed and the type of activity (e.g., movement) in a given video feed. The present invention can also provide for methods allowing the level of activity to be based on factors such as the amount of audio activity, including the number of different speakers, and the level of video activity, including the amount of overall movement, as well as the number of moving figures. The present invention can also provide both a feed monitor, which keeps track of the relative level of activity in each of the feeds, and a feed display director, which modifies the display layout based on the relative level of feed activity.

With the current invention, for example, a given user can request that in their composite display, all of the most active feeds are made larger and are located more centrally, while the displays of less active feeds are made smaller and positioned on the periphery.

In the present invention, a user is able to specify how frequently the layout should be updated, and how aggressively the relative size should be computed. For example, a user might wish only moderately differently sized display panes or, alternatively, only one maximally large pane, with all others as small as possible.

In another aspect, the present invention provides for implementation, administration, and education concerning a data feed coordinating service that one organization can provide to another.

For sake of illustration, in this exemplary embodiment 100 shown in FIG. 1, the content of each of the composite images include the data feeds from these two participants 102, 103, as well as a feed from an additional source feed source 104. In this scenario, it is assumed that a salesperson is conducting a sales presentation to a client, and part of the sales presentation includes a presentation (e.g., a video presentation) from feed source 104.

One of the present invention's novel aspects is that potentially each participant has control of the presentation of his or her own composite image of the eMeeting taking place.

Therefore, since the layout of each participant's composite image depends on the layout rules he or she specifies, the composite image sent to each of these participants 102, 103 may differ. Some examples of the rules and the resulting composite images related to the sales eMeeting will be discussed in detail below, with reference to FIGS. 8 through 11.

FIG. 1 depicts an example of a network topology 100 of the exemplary embodiment. There are two client nodes 102,103 and a feed source 104, connected through network 105 to server 101.

The network 105 might be, for example, a computer network such as the Internet or an internal intranet. However, it should be apparent that network 105 might also be or include other types of links, such as a radio, microwave, or satellite link. That is, the precise details of the implementation of network 105 is not crucial to the present invention, since it will be apparent that the more important concept is the capabilities and results seen at the client nodes 102, 103.

The feed source 104 might be any device that can provide and receive a digitized data feed over the network 1040. Examples of such a source might include, but are not limited to, a source providing streaming video, e.g., Stanford University's online courses (see http://www-pcd.stanford.edu/cs547/online.html for details), or a source providing e.g., Colorado Public Radio (see http://cpr.org/listen/ for details).

Although only two client nodes 102, 103 and one feed source 104 are pictured in FIG. 1, the present invention is applicable to any number of either client nodes or feed sources, and it should be apparent that no feed source 104 would be necessary. Also, it is noted that, although the exemplary embodiment involves a TCP/IP-based network application, other forms of video conferencing environment are also applicable, such as, but not limited to, videoconferences (e.g., where the audio is broadcast via standard telephone service).

Figure 2:
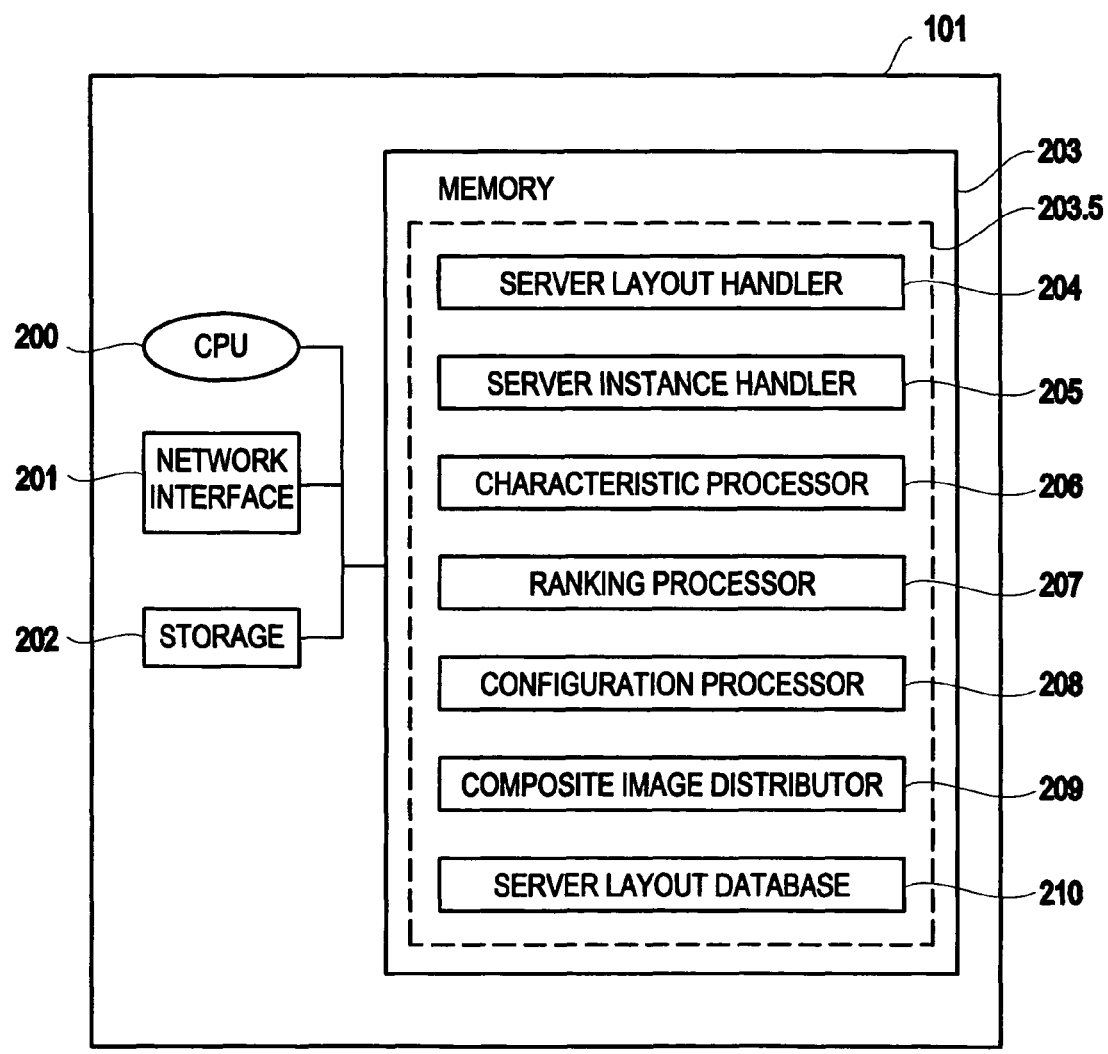
FIG. 2 shows an exemplary component diagram of the server 101 of the exemplary embodiment.

FIG. 2 depicts a more detailed component diagram of the server node 101, which manages all eMeeting instances, including the composition of screen returned to each participant. This server 101 can be any computing node capable to act as an HTTP server. This includes, but is not limited to, the products sold by the assignee under the trademarks ThinkPad® or PowerPC®, running the operating system and server application suite, for example, as sold by Microsoft under the trademark Windows NT®.

The server 101 preferably includes a CPU 200, a network interface 201, a storage device 202, such as a disk or DASD, and memory 203, such as RAM. According to the present invention, the server logic 203.5, discussed in more detail with reference to FIG. 3, is exemplarily embodied as computer-executable code, that might be loaded from a remote source (e.g., over the network 105 via the network interface 201) or from a local permanent optical (CD-ROM) memory, magnetic storage (such as disk), or DASD 202, into memory 203 for execution by CPU 200.

As shown in FIG. 2, the memory 203 exemplarily includes:
A Server Instance Handler 205 (discussed in detail with reference to FIG. 3);
A Server Layout Database 210; and
A Server Layout Handler 204, Characteristic Processor 206, Ranking Processor 207, Configuration Processor 208, and Composite Image Broadcast Distributor 209 (all of which are discussed in detail with reference to FIGS. 3 and 4).

The Server Layout Database 210 can be any application providing access and persistent management of data, such as that sold by the assignee under the trademark DB/2®. One with ordinary skill in the art will also appreciate that the Server Layout Database 210 could be run on another remote network-connected node and accessed via the network 105.

Figure 3:
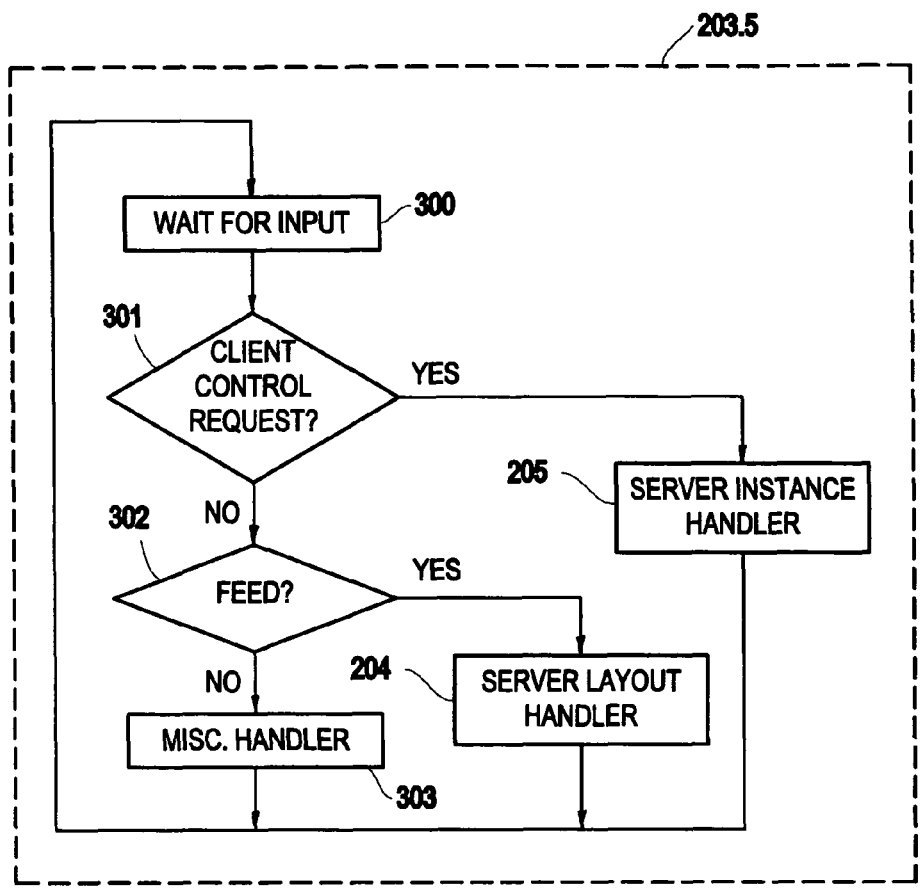
FIG. 3 shows an exemplary server's logic 203.5.

FIG. 3 shows a detailed flow diagram of the server logic 203.5, that is, the control flow for server 101. As shown, the server 101 awaits input in step 300, and then checks whether the input is a control request from a client 101,102 in step 301.

If the input is such a control request, then the Server Instance Handler 205 is called, following which control resumes at step 300. If the input is not a client control request, then, in step 302, the input is checked to see whether it is a data feed. If not, then a miscellaneous handler, beyond the scope of the current invention, is invoked in step 303, following which control continues at step 300. If the input is data feed, then the Server Layout Handler 204 (described in detail with reference to FIG. 4) is invoked, following which control continues at step 300.

The Server Instance Handler 205 might include a standard HTTP Server, such as the product sold by the assignee under the trademark WebSphere®. In addition, the Server Instance Handler 205 would typically include facilities to respond to the eMeeting user control requests, these requests sent to the server 101, using the HTTP protocol. Means for augmenting a generic HTTP server to include this support might include, but are not limited to, the use of CGI-bin scripts and Java® Servlets.

A client control request (e.g., step 301 in FIG. 3) can include, but is not limited to the following:
A request to create a new eMeeting instance,
A request from a client to join an eMeeting,
A request from a client to exit an eMeeting, or
A request from a client to set or modify their layout rule set.

If the control signal request is one to create a new eMeeting instance, the Server Instance Handler 205 creates a new presentation entry in the Server Layout Database 210. If the request is one from a user asking to join an existing presentation, the Server Instance Handler 205 takes the user ID for the requestor and stores it in applicable Server Layout Database 210 entry, marking the user as active.

If the request is one to exit an eMeeting, then the user's ID is deleted from the applicable Server Layout Database 210 entry. If the request is from an active user who wants to set or modify their Layout Rule Set (e.g., their layout rules), the request including a specification of the new rules, then the Server Instance Handler 205 modifies the given user's entry in the applicable Server Layout Database 210 eMeeting entry and stores the new rules for the given client.

One with ordinary skill in the art, after reading this description and considering it as a whole, would readily appreciate that a participant could be given a default set of layout rules when they first join the meeting. One with ordinary skill in the art would also recognize that a given participant could also be given a list of predefined sets of layout rules from which to choose. Further, a given user could also opt to have their current rule set stored by the server 101 in its Server Layout Database 210, for use in future eMeetings, possibly even for use by other users.

One with ordinary skill in the art will further appreciate that a given layout rule set could be applied to more than one client. For example, a marketing department could provide feed layout rule sets that would be used in addition to the rule sets specified by individual users. For example, a meeting leader could give all customers a rule set designed for the standard customer, while all salesmen could be given a rule set designed for sales staff. When specified, such rule sets are stored in each applicable user's entry in the applicable eMeeting entry in the server's 101 Server Layout Database 210.

It is noted that, although not specifically shown, various methods could be used to allow user controls, such as setting up a layout rule set and entering into and exiting out of a meeting. An exemplary embodiment might include a graphical user interface (GUI) specifically designed for the present invention, so that the user would not need to type in code for the commands or setting up a layout rule set. The GUI would ideally include a listing of options that guide the user through the various stages. The GUI might also include a hierarchy structure such that an administrator might be able to override or otherwise control node layout rules or serve as a master controller for the entire meeting.

In the exemplary embodiment, Layout Rule Sets are collections of Layout Rules, associated with a given user, e.g.: Layout Rule #1, Layout Rule #2, Layout Rule #3, Layout Rule #4.

Each Layout Rule might be of the form:
(Condition) (Layout Specification)

In the above expression, Condition might be a Boolean formula having Atomic Conditions as the arguments, where Atomic Conditions might include:

Feed type, e.g., "audio" or "video";
The owner of the feed, e.g., "video feed owner='Ms Jane Doe'";
The overall number of active audio or video feeds; and
A characteristic of the feed's activity, e.g., "most recent video activity" or "greatest audio activity."

One with ordinary skill in the art will appreciate that a further possible video characteristic might include an activity detected in a given video feed, e.g., whether the video contains an image of someone speaking or raising his or her hand. Such activity data could be detected and retrieved from video data using standard video analysis techniques well known in the art.

In addition, Layout Specifications might include:
Whether audio is broadcast or muted;
Whether video is, or is not, displayed;
The size (or relative size) of the pane within which a given video feed is displayed, e.g., "20×20 pixels", "¼ of display," or "largest"; and
The location (or relative location) of the pane within which the given video feed is displayed, e.g., "Top, left-hand corner," "Center," or "Centered," (this last specification term indicating that the relevant pane should be positioned as close to center as possible).

Both the size and location Layout Specifications can include an indication of how aggressively the given specification is to be implemented. For example, a size rule indicating "largest" with a greater extent will cause a bigger pane than a rule with a smaller extent. Example will be described in detail with reference to FIGS. 8-11.

A given Layout rule set can also contain an indication of how frequently it should be rechecked. For example, a given rule set could indicate that it only needs to be rechecked every 10 seconds.

One with ordinary skill in the art will also appreciate that Layout Rules can also be given priorities. This enables the Server Layout Handler to resolve conflicts, i.e., in cases where the conditions for two different Layout Rules are met whose Layout Specifications do not match (e.g., one indicates a given video feed should be displayed while the other indicates it should not).

Figure 4:
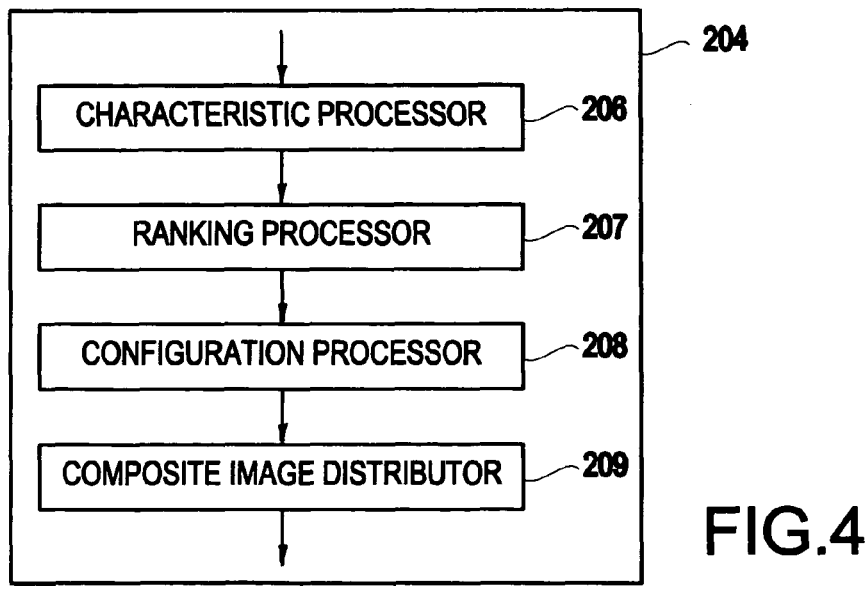
FIG. 4 shows an exemplary server layout handler 204.

FIG. 4 shows a detailed flow diagram of the Server Layout Handler 204, which is responsible for composing and returning the customized data feeds to each of the eMeeting's clients 102,103. As shown, the Server Layout Handler 204 first calls the Characteristic Processor 206, which examines all of the current data feeds and compiles a characteristics list of the relevant features. The particular features monitored match those contained in the Condition clauses of the Layout Rules. It is noted that all condition criteria must be determined, so that all of the Layout Rules can be evaluated. In the exemplary embodiment, this characteristics list includes a collection of vectors, one vector for each feed. The vector is defined as the features being tracked for each given feed, with the value of each dimension equaling the current value of each given feature.

Next, the Ranking Processor 207 is invoked to determine which of the Layout Rule Conditions for each client's layout rule set are met. In the exemplary embodiment, this is accomplished using a collection of ranking vectors (the ranking vector list), one such vector for each client. The number of dimensions of a given client's ranking vector equals the number of layout rules for the given client, with the value of each dimension indicating whether the given rule's specifications are to be used.

It is noted that this value can also indicate a priority, the higher the priority, the more important it is to implement the given rule's specification. This is one place that rule conflicts can be handled. For example, if two rules having conflicting specifications are both triggered, the rule with the higher ranking vector value will be implemented.

Following this, the Configuration Processor 208 is called to determine the final composite layout. This is accomplished using (1) the ranking vector list and (2) the layout rule specifications. As discussed in detail below with reference to FIGS. 9 and 11, the configuration processor 208 can also aid in the resolution of specification conflicts. It accomplishes this by making a best effort at fulfilling each specification. For example, if the display pane of two equally ranked feeds each are supposed to be largest and centered, then the Configuration Processor 208 will determine a composite window configuration in which the display pane for each feeds is as large as possible and as centered as possible.

Also, it is noted that the Configuration Processor 208 determines a layout for each client, not just a single overall layout. In addition, in the exemplary embodiment, the composite display configuration for each client is specified using a collection of configuration vectors (the configuration vector list), one vector for each feed, with each indicating the location and/or magnitude (e.g., volume) of the given feed. Finally, since layout rule specifications potentially can indicate that a given feed is not to be broadcast to a given client, given certain conditions, the composite feed display sent to different clients can differ not only in arrangement, but also in the number of feeds.

Finally, the Composite Image Distributor 209 is invoked to transmit the latest composite data feed to each client 102,103. It is noted that each client's composite data feed is composed of the current data feeds arranged using the given client's configuration vector for each feed.

Figure 5:
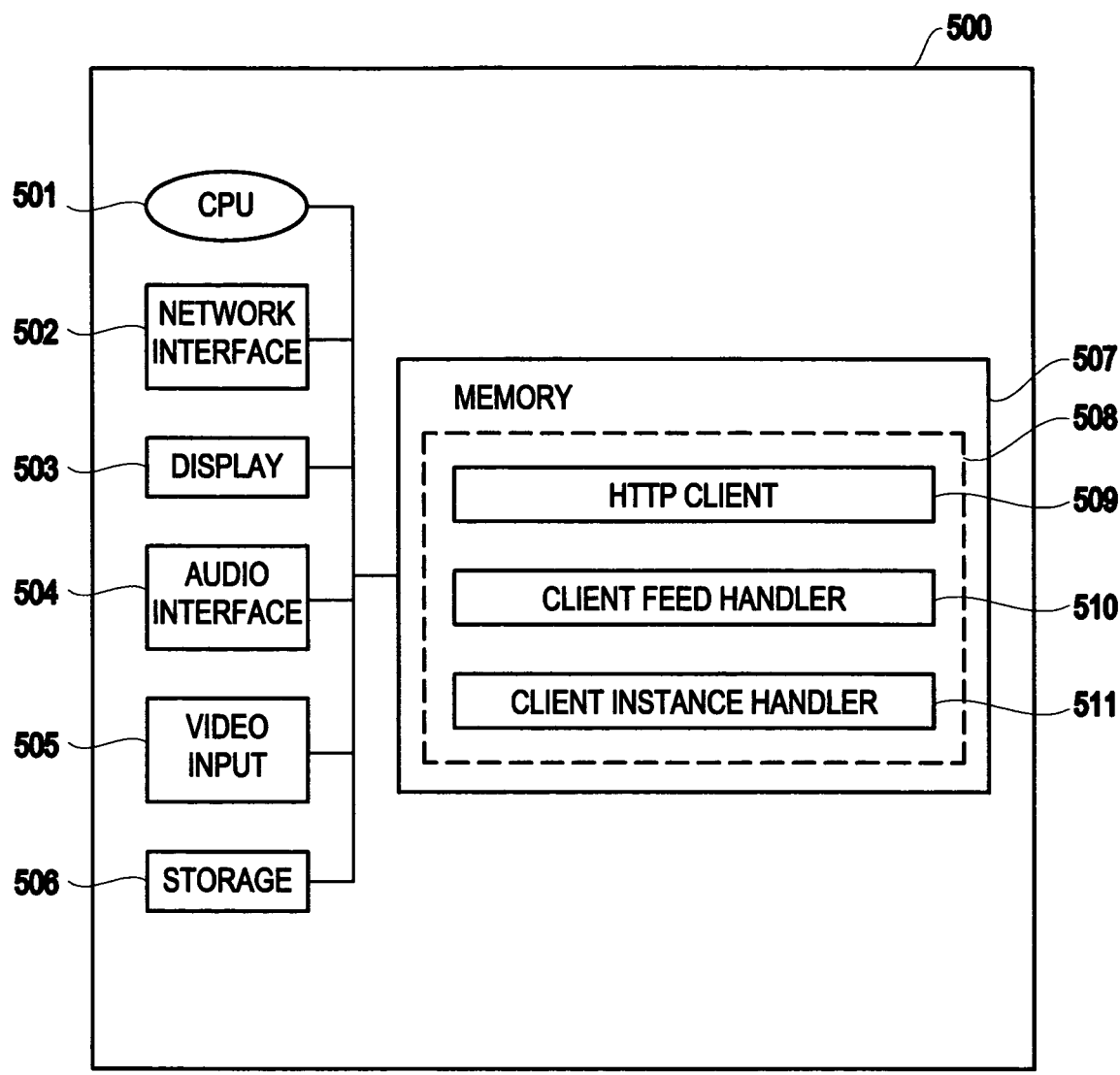
FIG. 5 shows an exemplary component diagram 500 of the client.

FIG. 5 depicts a more detailed component diagram 500 of the client nodes 102, 103. The client nodes 102, 103 of the exemplary embodiment can include any network node capable to act as an HTTP client. Examples include, but are not limited to, an IBM ThinkPad® running Windows 95 and a web browser such as Microsoft's Internet Explorer®. Clients can also include network-connectable mobile (e.g., portable) devices such as that sold under the trademark WorkPad® by IBM, as well as smart cellular telephones (e.g., devices which can act as a cellular telephone as well as run network applications, like web browsers), such as that sold under the trademark Nokia 90008® by Nokia.

As shown in FIG. 5, a client node 500, like that used by clients 102, 103, exemplarily include:
A CPU 501,
A network interface 502,
A display device 503,
An audio interface 504 (both input and output, e.g., microphone and speakers),
A video input device 505 (such as that sold under the trademark CuseeMe® from Cuworld Inc),
A storage device 506 (e.g., a disk or DASD), and
Memory 507 (e.g., RAM).

According to the present invention, the client logic 508 (which will be discussed in more detail with reference to FIG.

6), is exemplarily embodied as computer executable code that might be loaded from a remote source (e.g., over the network 105 via the network adapter 502), or from a local permanent optical (CD-ROM) or magnetic storage (such as disk), or DASD 506, into memory 507 for execution by CPU 501. The memory 507 exemplarily includes:

An HTTP Client 509,
A Client Feed Handler 510, and
A Client Instance Handler 5110.

Although not specifically shown in FIG. 5, it would also be possible to use a client node to serve as a feed source. For example, the computer used as the client node might contain a program stored in disk memory which is used in the same manner as feed source 104 previously discussed in reference to FIG. 1.

Figure 6:
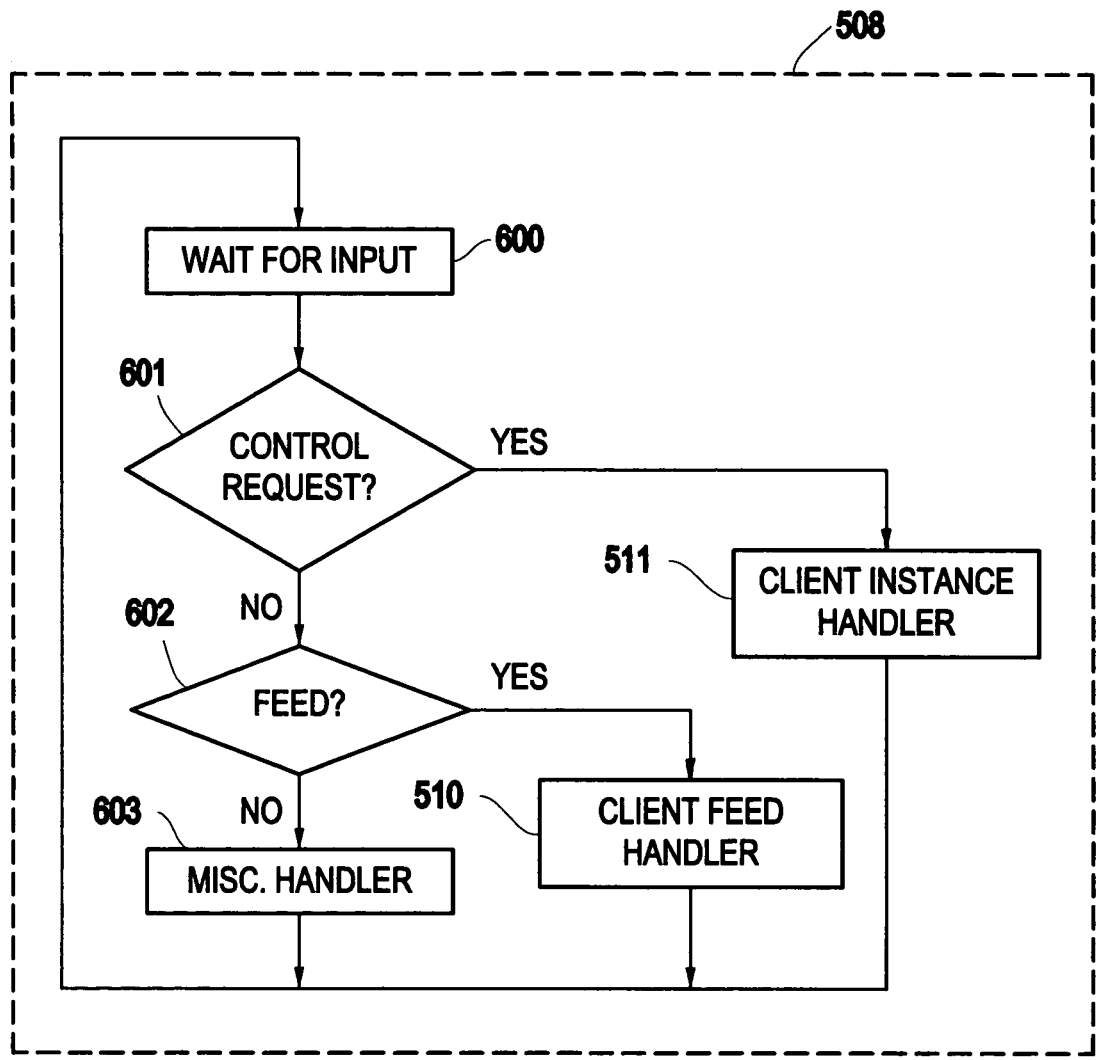
FIG. 6 shows an exemplary process 508 for the client's logic.

FIG. 6 exemplarily shows a detailed flow diagram 508 of the clients' logic. In the exemplary implementation, the client's logic 508 is implemented as an applet retrieved from the server 101, and run via the client's HTTP client 509. This applet provides both the Client Feed Handler 510 and the Client Instance Handler 511. As depicted in FIG. 6, the client 500 awaits input in step 600. Once received, the input is checked to see whether it is a control request, in step 601. If so, the Client Instance Handler 511 is invoked, following which, control resumes at step 600.

Control requests might include, but are not limited to, the following:
A given user to asking to connect to a given eMeeting and indicate their identity,
A given user requesting to set or update their Layout Rule set, and
A given user requesting to leave a given eMeeting.

In each case, the Client Instance Handler 510 retrieves the necessary information from the given client, and then transmits the request to the server 101, using the HTTP protocol.

If the data is not a control request, the step 602 checks whether it is a data feed. If so, the Client Feed Handler 5100 is invoked, following which control continues at step 600. The Client Feed Handler 510 manages all of the following
Transmitting the data generated by the client 500, including audio from the audio interface 504 and video from the video input 505 to the server 101; and
Presenting the data feeds transmitted from the server 101 to the active user, including audio via the audio interface 504 and video via the display 503.

Figure 7:
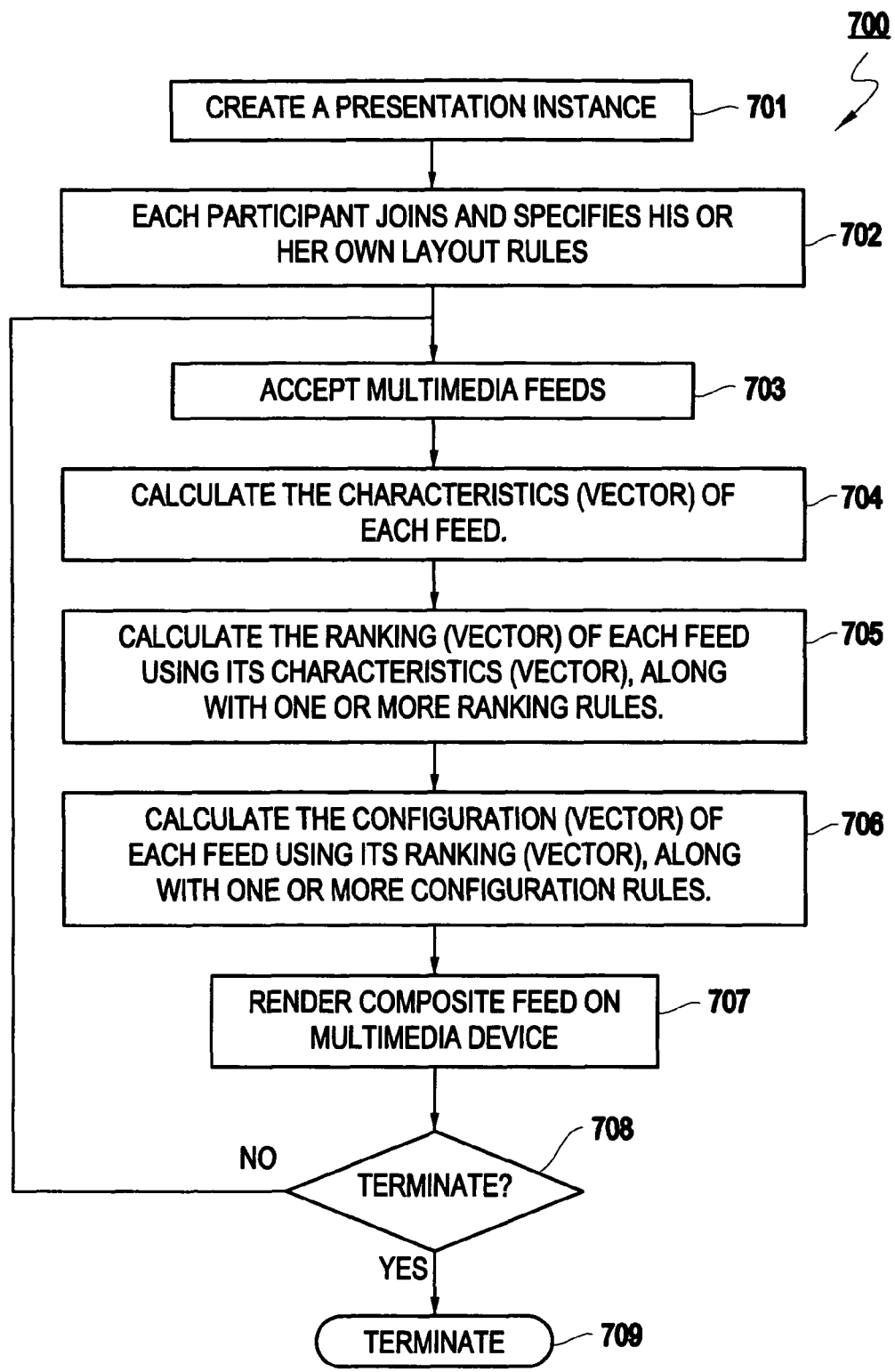
FIG. 7 shows an exemplary flowchart 700 of the overall process.

FIG. 7 shows a detail flow diagram 700 of the overall composite image management process. Initially a presentation instance is created using the Server Instance Handler 205 in step 701. Next, each eMeeting participant joins the eMeeting and specifies their Layout Rule Set in step 702. The server then accepts all data feeds in step 703, and then extracts all relevant characteristics from them in step 704. Next, in step 705, the layout rule conditions are checked to see which rules have been triggered.

The layout specifications are then determined and combined in step 706, with the resulting rendered data feeds transmitted to the clients in step 707. Step 708 determines whether the eMeeting has finished, terminating at step 709 if so, or continuing at step 703 if not.

FIGS. 8 through 11 show examples of the composite multi-paned feed displays that can be produced by the current invention. In particular, for illustration, they show how the current invention can be used to support the differing needs of a customer using client node 101, and a salesperson using client node 102.

The customer is very interested in both what the salesperson has to say and what the data source broadcasts, much more so than they are in what they themselves are saying. Therefore, following might be an example of the customer's layout rule set:

| | | |
|---|---|---|
| ((User == "Salesperson") AND (active)) | => | (Video position = "centered") |
| ((User == "Salesperson") AND (active)) | => | (Video size = "largest") |
| ((Type == "External Feed") AND (active)) | => | (Video position = "centered") |
| ((Type == "External Feed") AND (active)) | => | (Video size = "largest") |
| ((User == "Customer") | => | (Video size = "smallest") |
| ((User == "Customer") | => | (Video position = "bottom right") |

This rule set indicates that whenever the salesperson's video or audio is active, the salesperson's video should be positioned as close to center as possible and should be made as large as possible. Similarly, whenever an external data feed's audio or video is active, the video tile for this feed should be positioned as close to center as possible and should be made as large as possible. The customer's video tile should be made as small as possible and should be positioned in the bottom, right-hand corner of the composite display window.

Figure 8:
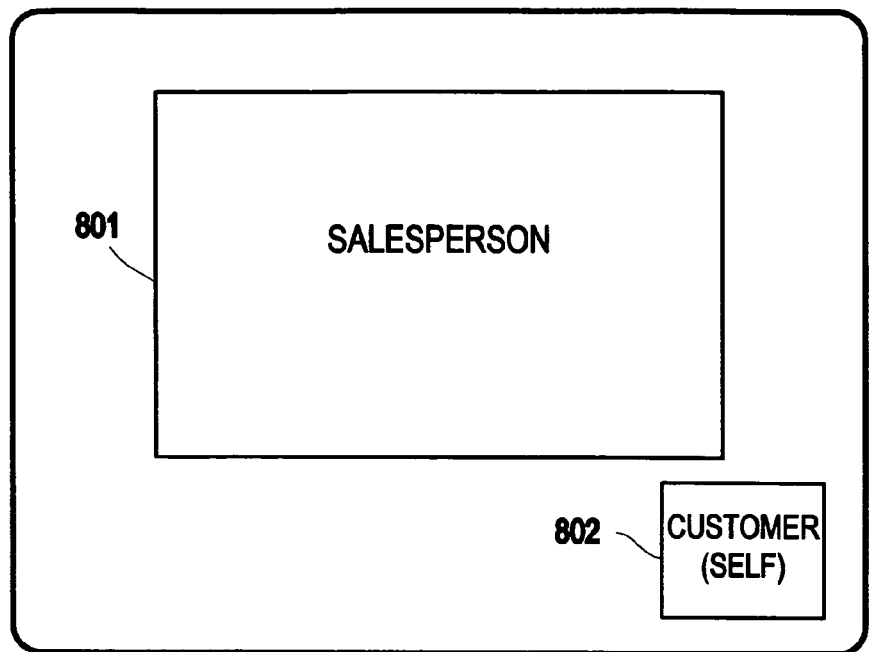
FIG. 8 shows an exemplary customer's initial composite image 800.

FIG. 8 exemplarily shows how the customer's composite screen 800 looks when the eMeeting begins. As shown, the tile 801 for the salesperson is located in the center, and is as large as possible given the available space. The customer's tile 802, in contrast, is many times smaller, and, as requested by the layout rule set, located in the bottom, right-hand corner of the composite window 800.

Figure 9:
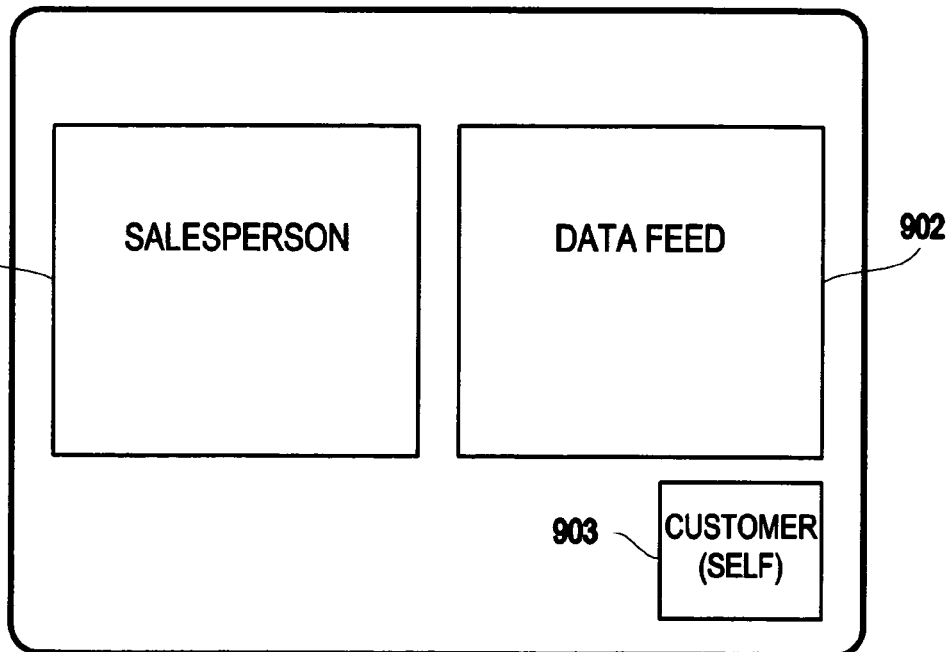
FIG. 9 shows an exemplary customer's composite image 900 after external data feed is added.

FIG. 9 shows how the customer's composite display 900 changes when the data source 104 begins broadcasting data. As shown, the customer's tile 903 remains small and in the bottom, right-hand corner. Since both the salesperson's video 901 and data source's video 902 are to be centered and made as large as possible, they must share the available space. Thus, the tile for the salesperson's video 901 and that for the data source 902 are made as large as possible, and are positioned as close to the center of the composite window 900 as possible.

In contrast, the salesperson has different interests than the customer. He or she is much more interested in the customer than either the data source's feed or themselves, both of which they have already seen many times before. The salesperson is even interested in seeing the customer when they are not moving or saying anything, to be able to monitor whether the customer has become confused or bored. Thus, here is an example of the saleperson's layout rule set:

| | | |
|---|---|---|
| (User == "Customer") | => | (Video position = "centered") |
| (User == "Customer") | => | (Video size = "largest") |
| ((Type == "External Feed") AND (active)) | => | (Video position = "top right) |
| ((Type == "External Feed") AND (active)) | => | (Video size = "medium") |
| (User == "Salesperson") | => | (Video size = "none") |

This rule set specifies that the salesperson always wants to see the customer's video feed maximally enlarged and centrally located, regardless of whether there is any activity. It also indicates that an external data feed should be shown, but in a tile of only size and positioned in the top right-hand corner of the composite window. Their own video feed should not be shown at all.

Figure 10:
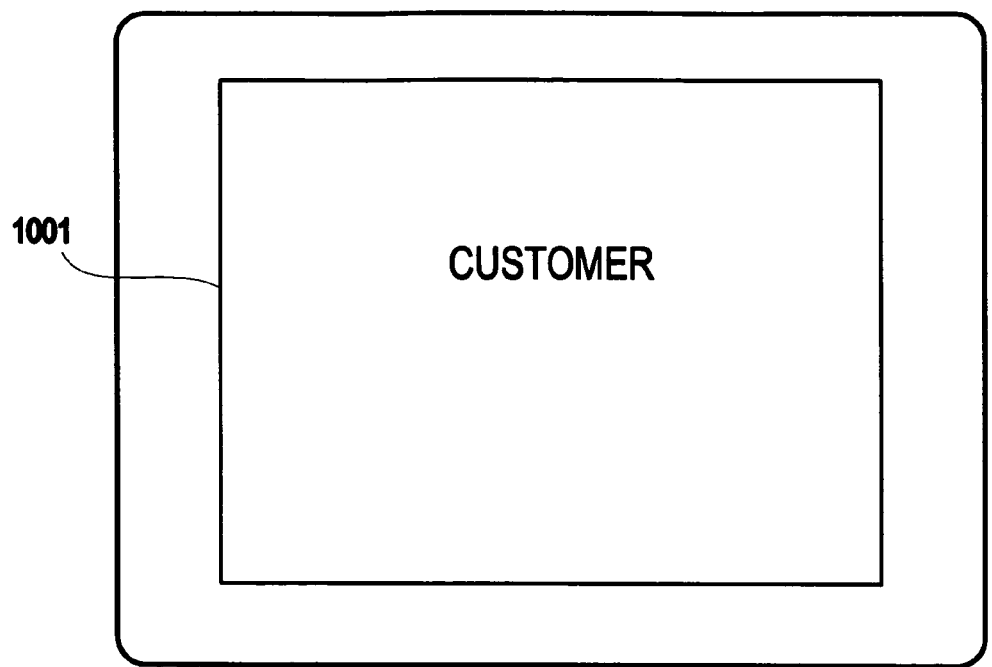
FIG. 10 shows an exemplary salesperson's initial composite image 1000.

As shown in FIG. 10, when the eMeeting starts, all the salesperson sees in their composite window 1000 is a maximally enlarged, centrally positioned, tile of the customer's video feed 1001. There is no tile for the salesperson, since they have specified in their layout rules that they are not interested in seeing their own video feed.

Figure 11:
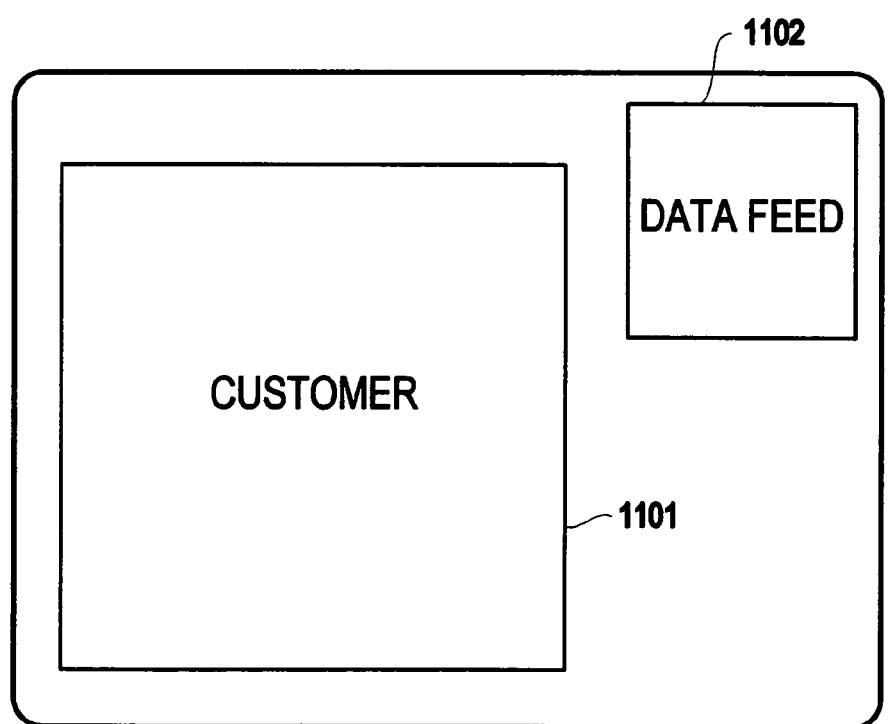
FIG. 11 shows an exemplary salesperson's composite image 1100 after external data feed is added.

FIG. 11 depicts the salesperson's composite window 1100 after the data source 104 begins its feed. As shown, the tile 1102 for the data source's feed is positioned in the top, right hand corner of the composite window 1100, and is about half the size of the tile 1101 for the customer's feed, which is still centered vertically, but now pushed slightly to the left.

If, at some point during the eMeeting, the salesperson decided she needed to be able to see her own video during the meeting, for example, so that she could verify that her video image was clear, she could send in an updated version of her layout rules, such as the following:

| | | |
|---|---|---|
| (User == "Customer") | => | (Video position = "centered") |
| (User == "Customer") | => | (Video size = "largest") |
| ((Type == "External Feed") AND (active)) | => | (Video position = "top right) |
| ((Type == "External Feed") AND (active)) | => | (Video size = "medium") |
| (User == "Salesperson") | => | (Video size = "none") |
| ((User == "Salesperson") AND (active)) | => | (Video size = "smallest") |
| ((User == "Salesperson") AND (active)) | => | (Video position = "bottom right) |

With this rule set, a tile for her own video feed would appear whenever she moved or spoke. This tile would be minimally sized and located in the bottom, right-hand corner of her composite image.

Although only three video feeds are discussed in the exemplary embodiment, resulting in a maximum of three tiles in FIGS. 8 through 11, the present invention is applicable to any higher number as well.

FIG. 12 illustrates a typical hardware configuration of an information handling/computer system in accordance with the invention and which preferably has at least one processor or central processing unit (CPU) 1211.

The CPUs 1211 are interconnected via a system bus 1212 to a random access memory (RAM) 1214, read-only memory (ROM) 1216, input/output (I/O) adapter 1218 (for connecting peripheral devices such as disk units 1221 and tape drives 1240 to the bus 1212), user interface adapter 1222 (for connecting a keyboard 1224, mouse 1226, speaker 1228, microphone 1232, and/or other user interface device to the bus 1212), a communication adapter 1234 for connecting an information handling system to a data processing network, the Internet, an Intranet, a personal area network (PAN), etc., and a display adapter 1236 for connecting the bus 1212 to a display device 1238 and/or printer 1239 (e.g., a digital printer or the like).

In addition to the hardware/software environment described above, a different aspect of the invention includes a computer-implemented method for performing the above method. As an example, this method may be implemented in the particular environment discussed above.

Such a method may be implemented, for example, by operating a computer, as embodied by a digital data processing apparatus, to execute a sequence of machine-readable instructions. These instructions may reside in various types of signal-bearing media.

Thus, this aspect of the present invention is directed to a programmed product, comprising signal-bearing media tangibly embodying a program of machine-readable instructions executable by a digital data processor incorporating the CPU 1211 and hardware above, to perform the method of the invention.

This signal-bearing media may include, for example, a RAM contained within the CPU 1211, as represented by the fast-access storage for example. Alternatively, the instructions may be contained in another signal-bearing media, such as a magnetic data storage diskette 1300 (FIG. 13), directly or indirectly accessible by the CPU 1211.

Whether contained in the diskette 1300, the computer/CPU 1211, or elsewhere, the instructions may be stored on a variety of machine-readable data storage media, such as DASD storage (e.g., a conventional "hard drive" or a RAID array), magnetic tape, electronic read-only memory (e.g., ROM, EPROM, or EEPROM), an optical storage device (e.g. CD-ROM, WORM, DVD, digital optical tape, etc.), paper "punch" cards, or other suitable signal-bearing media including transmission media such as digital and analog and communication links and wireless. In an illustrative embodiment of the invention, the machine-readable instructions may comprise software object code.

In addition, although the preferred embodiment is a web service (i.e., HTTP-based), one with regular skill in the art will appreciate that the current invention can also be implemented as a video conference, or as a raw socket-based client/server application.

In another aspect, the current invention also provides methods in which a first organization could employ to support the composite feed configuration service just described to a second organization. In this aspect of the present invention, an organization might use the techniques of the present invention as the basis for a service or business method.

As a first example, one having ordinary skill in the art will appreciate that a first organization could provide the composite feed configuration service to a second organization. That is, an organization might establish itself as a resource that conducts eMeetings for others or that establishes other organization with the capabilities to conduct meetings in accordance with the present invention.

This provision might exemplarily include determining the number of users that would be using the service, configuring a server 101, and then installing the server 101. The first organization would also have to ensure that members of the second organization had the required clients 500 to interact with the current invention, upgrading the existing hardware and software if necessary.

A first organization might also provide a service to train members of a second organization to use the composite feed configuration service. This training could include explanation of the layout rule sets, including tutoring on how given members could provide layout rule sets to the customers of the second organization.

A first organization might also support a second organization in the use of the composite feed configuration service, including providing packages of layout rule sets, including possibly layout rule sets that are customized for the second organization. This provision could also be supplied in the form of consulting (e.g., working with members of the second organization to develop layout rule sets especially applicable to the second organization).

While the invention has been described in terms of exemplary embodiments, those skilled in the art will recognize that the invention can be practiced with modification within the spirit and scope of the appended claims.

Further, it is noted that Applicants' intent is to encompass equivalents of all claim elements, even if amended later during prosecution.

Having thus described our invention, what we claim as new and desire to secure by Letters Patent is as follows:

1. A method of providing a composite data feed for an online meeting, said method comprising at least one of:
   providing a capability for at least one participant node in said online meeting to input a layout rule for a customized composite image of said online meeting to be seen specifically at said at least one participant node; and
   receiving a layout rule defining a composite image of said online meeting that can be customized for at least one participant node in said online meeting.

2. The method of claim 1, wherein said layout rule comprises a Boolean combination of conditions.

3. The method of claim 1, further comprising:
   receiving data feeds from a plurality of nodes included in said online meeting; and
   calculating a composite data feed image for said at least one participant node, said composite data feed image complying with said layout rule.

4. The method of claim 1, wherein said layout rule specifies at least one of:
   a size of a display pane in said composite image of a given feed involved in said online meeting;
   a relative size of said display pane of said given feed;
   a position of said display pane of said given feed;
   a relative position of said display pane of said given feed;
   whether said given feed is included in said composite image;
   how frequently said layout rule is to be checked for updates;
   how aggressively a layout specification of said layout rule should be executed in terms of a range of whether said composite image includes only moderately different sized displays or only one maximally large display with all other displays being maximally small;
   a status of an owner of said given feed; and
   a type of said given feed.

5. The method of claim 1, further comprising:
   transmitting said composite data feed image for display on a display device.

6. The method of claim 3, wherein said calculating is accomplished at a server remote from said at least one participant node.

7. The method of claim 3, wherein said calculating is accomplished at one of said at least one participant node's location.

8. The method of claim 1, wherein said receiving said layout rule is periodically checked so that said at least one participant node is able to revise said layout rule until one of:
   said at least one participant node exits said online meeting; and
   said online meeting terminates.

9. The method of claim 3, wherein said calculating the data feed includes at least one of:
   an amount of audio activity, including a number of different speakers; and
   a level of video activity, including at least one of an amount of overall movement and a number of moving figures.

10. The method of claim 3, said method further having at least one of the following capabilities:
    said receiving of data feeds is from one or more distinct network types;
    at least one node in said online meeting can serve as a data feed source;
    said at least one participant node is able to specify a personal weighting preference to be used in said calculating;
    a display for at least one input feed does not change;
    said at least one participant node is able to change said layout rules during a given online meeting;
    said at least one participant node is able to have at least some rules in said layout rules specified by another user, in addition to the rules said at least one participant node specifies; and
    a given set of layout rules can be applied to more than one said at least one participant node.

11. A method of providing a composite data feed for an online meeting, said method comprising:
    calculating a composite image of said online meeting that is to be seen uniquely at a participant node, wherein a layout rule for said calculating said composite image can be dynamically changed during a course of said online meeting.

12. An apparatus comprising at least one of:
    a graphical user interface to allow a participant node in an online meeting to provide a layout rule set for a customized composite image of said online meeting that is to be seen at said participant node;
    a receiver to receive a layout rule set that defines a customized composite image to be presented to a participant node in an online meeting; and
    a calculator to calculate a customized composite image to be presented to a participant node in an online meeting, said calculator receiving a plurality of feeds related to said online meeting and calculating said customized composite image in accordance with a layout rule set that defines a composite image to specifically be presented to said participant node.

13. A system comprising:
    a first participant node;
    at least one of a second participant node and a data feed node; and
    a network interconnecting said first participant node to said at least one of a second participant node and a data feed, said network thereby providing an online meeting including said first participant node,
    wherein said first participant node receives a customized composite image of said online meeting that is calculated in accordance with a layout rule that defines a composite image to be presented specifically to said first participant node.

14. A non-transitory signal-bearing storage medium tangibly embodying a program of machine-readable instructions executable by a digital processing apparatus to perform a method of providing a composite data feed for an online meeting, said method comprising at least one of:
    providing a capability for at least one participant node in said online meeting to input a layout rule for a customized composite image of said online meeting to be seen specifically at said at least one participant node; and
    receiving a layout rule defining a composite image of said online meeting that can be customized for at least one participant node in said online meeting.

* * * * *